United States Patent [19]

Zion

[11] Patent Number: 4,758,395

[45] Date of Patent: Jul. 19, 1988

[54] METHOD OF MOLDING THICK PARTS OF FIBROUS-PLY-REINFORCED RESIN

[75] Inventor: Earl M. Zion, Newark, Ohio

[73] Assignee: Owens-Corning Fiberglas Corporation, Toledo, Ohio

[21] Appl. No.: 926,748

[22] Filed: Nov. 4, 1986

[51] Int. Cl.⁴ .................. B32B 31/12; B32B 31/04; B29C 67/00

[52] U.S. Cl. .................. 264/135; 264/137; 264/258

[58] Field of Search .......... 264/135, 137, 258

[56] References Cited

U.S. PATENT DOCUMENTS

| 3,408,239 | 10/1968 | Wedin | 264/137 X |
| 4,123,488 | 10/1978 | Lawson | 264/135 O |
| 4,404,261 | 9/1983 | Canning et al. | 264/258 X |

FOREIGN PATENT DOCUMENTS

| 53-147765 | 12/1978 | Japan | 264/258 |
| 2034635A | 6/1980 | United Kingdom | 264/258 |

OTHER PUBLICATIONS

"The Mechanical Properties of an SMC-R50 Composite", Douglas L. Denton, 1979, by Owens-Corning Fiberglas Corporation.
Pre-Impregnation, pp. 277-282, "SPI Handbook of Technology and Engineering of Reinforced Plastic/Composites", 1973.

Primary Examiner—Jan H. Silbaugh
Assistant Examiner—Yun Hsia Wang
Attorney, Agent, or Firm—Patrick P. Pacella; Ronald E. Champion

[57] ABSTRACT

The method comprises placing upper and lower stacks of unimpregnated fibrous reinforcement plies having a core of preimpregnated fibrous reinforcement plies therebetween in a mold and injecting chemically activated resin to impregnate the upper and lower stacks of unimpregnated fibrous reinforcement plies and initiate curing of heat-activatable resin of the core, and removing the molded part from the mold after curing and cooling of the part.

7 Claims, 1 Drawing Sheet

METHOD OF MOLDING THICK PARTS OF FIBROUS-PLY-REINFORCED RESIN

TECHNICAL FIELD

This invention relates to the molding of reinforced plastic parts up to two inches thick, the reinforcement comprising a plurality of stacked fibrous plies.

BACKGROUND ART

Prior to my invention, thick molded parts of fibrous-ply-reinforced resin were subject to having internal cracks, voids, or poor lamination.

U.S. Pat. No. 4,404,261, issued to John L. Canning and John F. Kay on Sept. 13, 1983, discloses molding of multiple plies of sheet molding compound reinforced with chopped glass roving, each ply having its own formulation with respect to polymerization initiating temperature, and the center ply having the lowest such temperature with successive plies in each direction having progressively higher such temperatures, whereby all plies begin to cure about at the same time from the heat of the mold.

DISCLOSURE OF INVENTION

In accordance with the invention, chemically activated resin is injected into a mold containing upper and lower stacks of unimpregnated fibrous reinforcement plies having a core of fibrous reinforcement plies therebetween preimpregnated with a heat-activable resin. The curing of the heat-activable resin of the core is initiated by the exothermal reaction of the chemically activated injected resin.

BRIEF DESCRIPTION OF THE DRAWINGS

The invention is more fully explained hereinafter, reference being taken to the accompanying drawings wherein.

BEST MODE OF CARRYING OUT THE INVENTION

Figure 1:
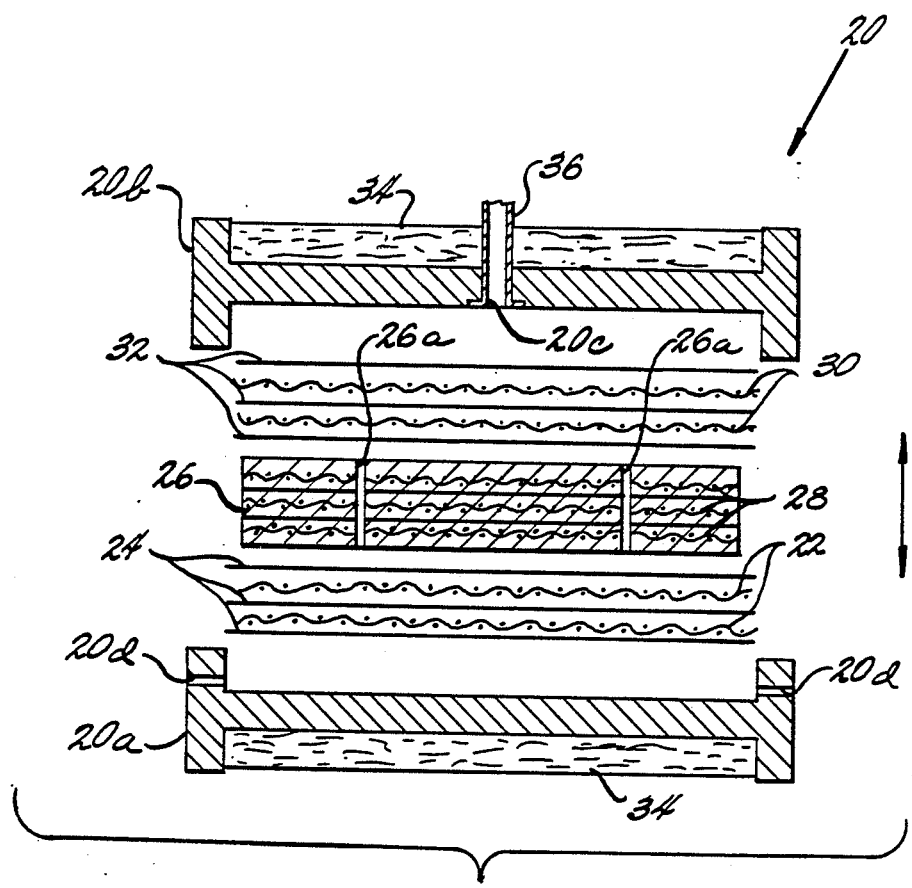
FIG. 1 is a schematic exploded vertical sectional view illustrating the process of the invention.
Figure 2:
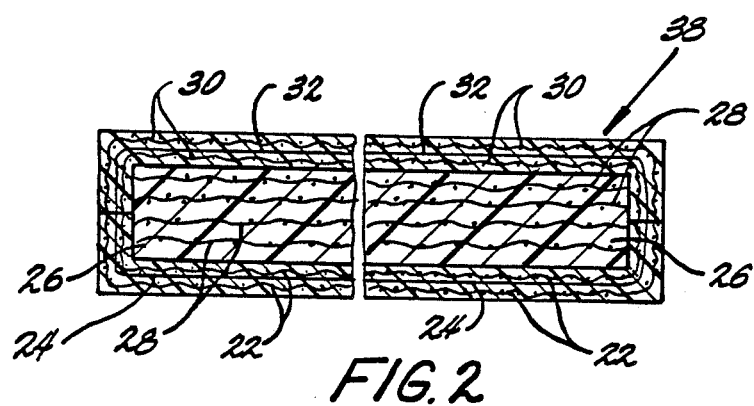
FIG. 2 is a schematic vertical sectional view of an article molded by the process of the invention.

With reference to the drawings, FIG. 1 illustrates the molding process of the invention. A mold 20 includes a lower portion 20a and an upper portion 20b. As a first step, several unimpregnated fibrous reinforcement plies are stacked in place in the lower mold portion 20a. Preferably, the reinforcement plies are made of glass fibers. As an example, there may be twelve woven glass roving plies 22 interleaved between thirteen continuous glass strand plies 24. For simplicity, only two plies 22 and three plies 24 are shown. Then a core 26 is placed on top of the stacked plies 22 and 24. The core 26 comprises a plurality (for example, twenty-four, with only three being shown) of stacked preimpregnated fibrous reinforcement plies 28, preferably of glass fiber and preferably of woven glass roving, preimpregnated with a heat-activable thickened thermosetting resin (e.g., polyester resin), including a low-temperature (e.g., 150° F.) catalyst. The core 26 may be provided with vertically extending flow-through vents 26a. After the core 26 is in place, several more fibrous reinforcement plies are stacked on top of the core. Preferably, the latter plies are also made of glass fibers. As an example, there may be twelve plies 30 of woven glass roving interleaved between thirteen continuous glass strand plies 32, identical to the arrangement of plies 22 and 24 below the core 26.

The upper mold portion 20b of the mold 20 is then secured in place by suitable fastening means (not shown). The mold 20 is preferably insulated by insulating material 34, and even more preferably, it is maintained at a temperature of about 150° F. by suitable heating means such as hot water coils or electrical resistance heaters (not shown). Chemically activated thermosetting resin such as polyester resin with conventional catalysts, promoters, and initiators as additives is then injected under pressure through a nozzle 36 and an aperture 20c in the upper mold portion 20b, to impregnate the plies 22, 24, 30, and 32. Leakage of some resin through vents 20d in the lower mold portion 20a indicates that the mold 20 is full and that no more resin should be injected. The heat given off by the chemically activated resin initiates curing of the resin of the core 26. The insulation 34 and the heating means (not shown) for the mold 20 prevent excessive heat loss from the chemically activated resin to the mold, whereby sufficient heat from the chemically activated resin is available to cure the resin of the core 26. After all the resin is cured and cooled, the molded part is removed from the mold 20 and is free of internal cracks. The molding method allows large integrated structures to be molded.

Various modifications may be made in the method described without departing from the spirit and scope of the invention.

I claim:

1. A method of molding thick parts of fibrous-ply-reinforced thermosetting resin, the method comprising placing in a lower portion of a mold upper and lower stacks of unimpregnated fibrous reinforcement plies having a core of preimpregnated fibrous reinforcement plies therebetween said upper stack, said lower stack and said core having a thickness up to two inches, the plies of the core being preimpregnated with a thickened thermosetting resin, heat-activable at about 150° F., closing the mold with an upper portion thereof, and injecting chemically activated thermosetting resin into the mold under pressure, to impregnate the upper and lower stacks of unimpregnated fibrous reinforcement plies, said chemically activated thermosetting resin giving off heat during cure, and preventing excessive heat loss from the chemically activated thermosetting resin to the mold by insulating said mold, whereby heat given off by the chemically activated thermosetting resin initiates curing of the thermosetting resin of the core.

2. A method as claimed in claim 1 wherein the reinforcement plies are glass fiber plies.

3. A method as claimed in claim 1 wherein the reinforcement plies include woven glass roving plies.

4. A method as claimed in claim 1 wherein the reinforcement plies of the core are woven glass roving plies.

5. A method as claimed in claim 1 wherein the upper stack of reinforcement plies comprises a plurality of woven glass roving plies interleaved between a plurality of continuous glass strand plies.

6. A method as claimed in claim 1 wherein the lower stack of reinforcement plies comprises a plurality of woven glass roving plies interleaved between a plurality of continuous glass strand plies.

7. A method as claimed in claim 1 wherein each of the upper and lower stacks of reinforcement plies comprises a plurality of woven glass roving plies interleaved between a plurality of continuous glass strand plies and the plies of the core are woven glass roving plies.

* * * * *